(12) United States Patent
Kim et al.

(10) Patent No.: US 9,365,356 B2
(45) Date of Patent: Jun. 14, 2016

(54) FLOATING HANGER FOR ASSEMBLING VEHICLE BODY ROOF

(71) Applicant: Hyundai Motor Company, Seoul (KR)

(72) Inventors: Ju Young Kim, Cheonan-si (KR); Chul Kim, Cheonan-si (KR); Jong Ryul Choi, Asan-si (KR); Byung-Sun Kim, Cheonan-si (KR); Gi Young Lee, Ulsan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 324 days.

(21) Appl. No.: 14/055,278

(22) Filed: Oct. 16, 2013

(65) Prior Publication Data

US 2014/0165388 A1    Jun. 19, 2014

(30) Foreign Application Priority Data

Dec. 17, 2012   (KR) ................ 10-2012-0147791

(51) Int. Cl.
| | |
|---|---|
| *B65G 43/00* | (2006.01) |
| *B25J 15/00* | (2006.01) |
| *B25J 17/02* | (2006.01) |
| *B62D 65/02* | (2006.01) |
| *B62D 65/18* | (2006.01) |

(52) U.S. Cl.
CPC ............. *B65G 43/00* (2013.01); *B25J 15/0061* (2013.01); *B25J 17/0208* (2013.01); *B62D 65/022* (2013.01); *B62D 65/18* (2013.01); *B62D 65/024* (2013.01); *Y10T 29/53543* (2015.01)

(58) Field of Classification Search
CPC .. B65G 43/00; B25J 17/0208; B25J 15/0061; B62D 65/18; Y10T 29/53543
See application file for complete search history.

(56) References Cited

U.S. PATENT DOCUMENTS

| | | | | |
|---|---|---|---|---|
| 5,647,240 | A * | 7/1997 | Jacobson | .................. B21F 3/02 72/135 |
| 2002/0105689 | A1 * | 8/2002 | Otoko | .................. H04N 1/1013 358/505 |
| 2003/0070272 | A1 * | 4/2003 | Zirbs | ...................... B62D 65/02 29/407.04 |

* cited by examiner

*Primary Examiner* — Moshe Wilensky
(74) *Attorney, Agent, or Firm* — McDermott Will & Emery LLP (57) ABSTRACT

A floating hanger for assembling a vehicle body roof sets a roof panel at a home position of a roof surface of a vehicle body which is transferred to a work position along a transfer line. The floating hanger includes: i) a fixing frame fixed to an arm of a robot; ii) a hanger frame configured to restrict the roof panel and installed at the fixing frame to be floatable in a width direction of the vehicle body, and iii) a position corrector installed at the hanger frame and configured to float the hanger frame to a set position of the roof panel by using pressure which is applied to both sides of the roof panel in a width direction.

9 Claims, 6 Drawing Sheets

FLOATING HANGER FOR ASSEMBLING VEHICLE BODY ROOF

CROSS-REFERENCE TO RELATED APPLICATION

This application claims priority to and the benefit of Korean Patent Application No. 10-2012-0147791 filed in the Korean Intellectual Property Office on Dec. 17, 2012, the entire contents of which are incorporated herein by reference.

TECHNICAL FIELD

An embodiment of the present invention relates to a vehicle body assembly system, and more particularly, to a floating hanger for assembling a vehicle body roof, which is provided to assemble a roof panel to a vehicle body in a vehicle body assembly process.

BACKGROUND

In general, a vehicle body is formed in a body in white (B.I.W.) by assembling various product panels produced in a vehicle body sub process.

The vehicle body includes a floor panel disposed at a lower portion of a frame to support a driving unit such as an engine, axles, and the like and seats and the like, both side panels for left and right side surfaces of the frame, a roof panel for an upper surface of the frame, a plurality of roof rails, a cowl panel, a back panel, a package tray, and so on.

The vehicle body is assembled in a vehicle body assembly line, which performs welding with a welding robot, after setting a floor panel, a back panel, side panels, a roof panel, a roof rail, a cowl panel, a package tray, and the like.

In the vehicle body assembly line, after the back panel is attached to the floor panel, both side panels, the roof panel, the roof rail, the cowl panel, the package tray, and the like are assembled by welding.

The roof panel assembly line is a process of setting the roof panel on a roof surface of the vehicle body in which the side panels are assembled to the floor panel and welding the roof panel on the roof surface of the vehicle body by a welding robot where the roof panel is restricted by a restrictor which copes with different types vehicles by rotating a four surface index rotating body disposed at both sides.

Here, the roof panel is set on the roof surface of the vehicle body to be clamped by a roof hanger mounted at a front end of an arm of a robot, and may be welded on the roof surface of the vehicle body to be restricted by the roof hanger and the restrictor of the four surface index rotating body.

However, since the method of assembling the roof panel of the related art requires the four surface index rotating body in order to restrict the roof panel, a structure of the entire facility may be complicated, a process area may be excessively increased, and an initial investment cost for the facility may be increased.

In addition, because the roof panel is welded on the roof surface of the vehicle body by the welding robot where the roof panel is restricted by the restrictor of the four surface index rotating body and the roof hanger, productivity and workability deteriorate as assembly variations excessively occur, and production costs due to maintenance of the four surface index rotating body may be increased.

Moreover, the related art is not configured to flexibly manage a mixed line production of various types of vehicles since the related art uses the roof hanger which is limited to roof panel assembly of four types of vehicle due to the four surface index rotating body.

The above information disclosed in this Background section is only for enhancement of understanding of the background of the present disclosure and therefore it may contain information that does not form the prior art that is already known in this country to a person of ordinary skill in the art.

SUMMARY

The present disclosure has been made in an effort to provide a floating hanger for assembling a vehicle body roof to manage various types of vehicles with a simple configuration by removing a four surface index rotating body, and improving various assembly lines of a roof panel of a vehicle body.

An embodiment of the present invention describes a floating hanger for assembling a vehicle body roof to set a roof panel at a home position of a roof surface of the vehicle body which is transferred to a work position along a transfer line, the floating hanger including: i) a fixing frame fixed with an arm of a robot; ii) a hanger frame configured to restrict the roof panel and to be floatable in a width direction of the vehicle body; and iii) a position corrector to float the hanger frame to a set position of the roof panel by using pressure applied to both sides of the roof panel in a width direction of a vehicle.

In the floating hanger for assembling the vehicle body roof according to the embodiment of the present invention, the hanger frame may be moved in the width direction of the vehicle body, and may set the roof panel at a home position of the roof surface.

The floating hanger for assembling the vehicle body roof according to the embodiment of the present invention may further include a floater installed to float the hanger frame with respect to the fixing frame based on the vehicle body.

In the floating hanger for assembling the vehicle body roof according to the embodiment of the present invention, the floater may include a pair of guide bars installed at the hanger frame in parallel to the width direction of the vehicle body, and coupling blocks installed at the fixing frame and coupled with the guide bars.

The floating hanger for assembling a vehicle body roof may include a locker mounted on the hanger frame, selectively coupled with the fixing frame and configured to lock a floating operation of the hanger frame.

In the floating hanger for assembling a vehicle body roof, the locker may include a locking cylinder fixed at the hanger frame, which moves a locking member forward and backward and may be coupled with the fixing frame.

In the floating hanger for assembling a vehicle body roof, a coupling groove having a V shape, which the locking member is selectively coupled with, may be formed in the fixing frame.

In addition, the position corrector may include a bidirectional cylinder fixed at a center of a lower surface of the hanger frame, moving brackets coupled with both operating rods of the bidirectional cylinder, and stopper members installed at the ends of the moving brackets and configured to restrict both sides of the roof panel.

In the floating hanger for assembling a vehicle body roof, the moving brackets may be slidably coupled with guiders provided at the hanger frame by sliders.

In the floating hanger for assembling a vehicle body roof, the bidirectional cylinder may provide same operational force to the moving brackets.

In the floating hanger for assembling a vehicle body roof, a restrictor configured to restrict the roof panel may be installed at the hanger frame.

According to the embodiments of the present invention, removing a four surface index rotating body of the related art, and applying a vision system and a floating structure of the hanger frame may improve productivity and reduce investment costs for facilities and production costs for follow-up maintenance.

In addition, in the embodiment of the present invention, because assembly variations of the roof panel may be reduced, assembly quality and mass productivity of the roof panel may be improved.

BRIEF DESCRIPTION OF THE DRAWINGS

The drawings are provided for reference to explain an illustrative embodiment of the present invention, and the technical spirit of the present disclosure should not be interpreted to be limited to the accompanying drawings.

DETAILED DESCRIPTION OF THE EMBODIMENTS

The present disclosure will be described more fully hereinafter with reference to the accompanying drawings, in which embodiments of the present invention are shown. As those skilled in the art would realize, the described embodiments may be modified in various different ways, all without departing from the spirit or scope of the present disclosure.

To clearly describe the present disclosure, parts that are irrelevant to the description are omitted. Like numerals refer to like or similar constituent elements throughout the specification.

The size and the thickness of each component illustrated in the drawings are arbitrarily illustrated in the drawings for better understanding and ease of description, but the present disclosure is not limited to the illustration. In the drawings, the thicknesses of various portions and regions are enlarged for clarity.

Further, in the following detailed description, names of constituents, which are in the same relationship, are divided into "the first", "the second", and the like, but the present disclosure is not limited to the order in the following description.

In the specification, unless explicitly described to the contrary, the word "comprise" and variations such as "comprises" or "comprising" will be understood to imply the inclusion of stated elements but not the exclusion of any other elements.

In addition, the terminologies such as ". . . unit", ". . . means", ". . . part", or ". . . member", which are disclosed in the specification, refer to a unit of an inclusive constituent which performs at least one of the functions or operations.

Figure 1:
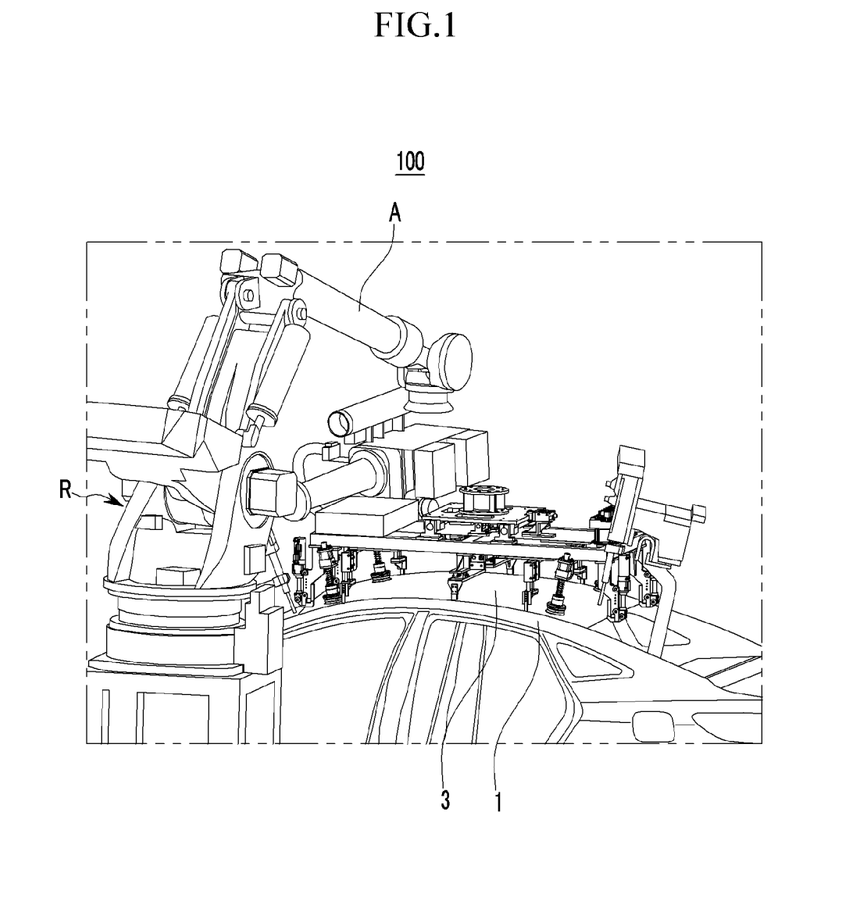
FIG. 1 is a view illustrating an example of using a floating hanger for assembling a vehicle body roof according to an exemplary embodiment of the present invention.

FIG. 1 is a view illustrating an example of using a floating hanger for assembling a vehicle body roof according to an embodiment of the present invention.

Referring to FIG. 1, a floating hanger 100 for assembling a vehicle body roof according to an embodiment of the present invention may be applied to a vehicle body assembly line for welding and assembling a floor panel, a back panel, side panels, a roof panel, a roof rail, a cowl panel, a package tray, and the like.

The floating hanger 100 for assembling a vehicle body roof is provided to set a roof panel 3 at a home position of a roof surface of a vehicle body 1 in a process of welding and assembling the roof panel 3 on the roof surface of the vehicle body 1 in which a back panel and both side panels are assembled to a floor panel.

In assembly lines, a transfer direction of a vehicle body is called a T direction, a width direction of a vehicle body is called an L direction, and a height direction of a vehicle body is called an H direction, but the present disclosure is based on the transfer direction, the width direction, and the height direction of a vehicle body instead of the LTH directions.

For example, in the roof panel assembly process, the roof panel 3 is taken out by a robot and set on the roof surface of the vehicle body 1 by the floating hanger 100 according to the embodiment of the present invention where the roof panel 3 is aligned by an alignment jig and welded on the vehicle body 1 by welding robots.

The floating hanger 100 according to the embodiment of the present invention refers to a robot hanger that is mounted on a robot R, and may set the roof panel 3 at a home position of the roof surface of the vehicle body 1 which is transferred to a work position along a transfer line.

Here, a position correction of the roof panel 3 with respect to the vehicle body 1 in a vehicle body transfer direction (T direction) may be operated by measuring a tooling hole in a pillar of the vehicle body 1 by a vision, calculating an error value through a vision controller and transmitting the error value to the robot R.

However, in the embodiment of the present invention, a home position of roof panel 3 according to a width direction (L direction) of the vehicle body 1 is set by a predetermined position of the roof surface by the robot R.

The floating hanger 100 for assembling a vehicle body roof according to the embodiment of the present invention has a simple configuration by removing a four surface index rotating body of the related art and thus may cope with various types of vehicles and may improve assembly variations of the roof panel 3 with respect to the vehicle body 1.

Figure 2:
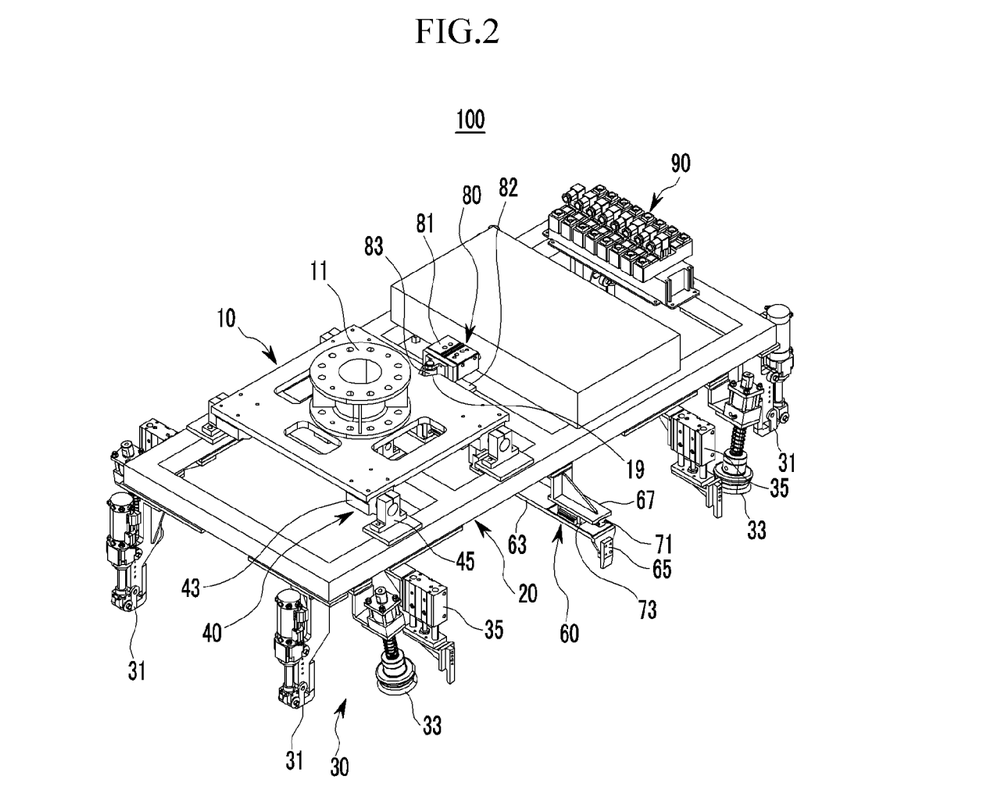
FIGS. 2 and 3 are perspective views illustrating the floating hanger for assembling a vehicle body roof according to the embodiment of the present invention.
Figure 3:
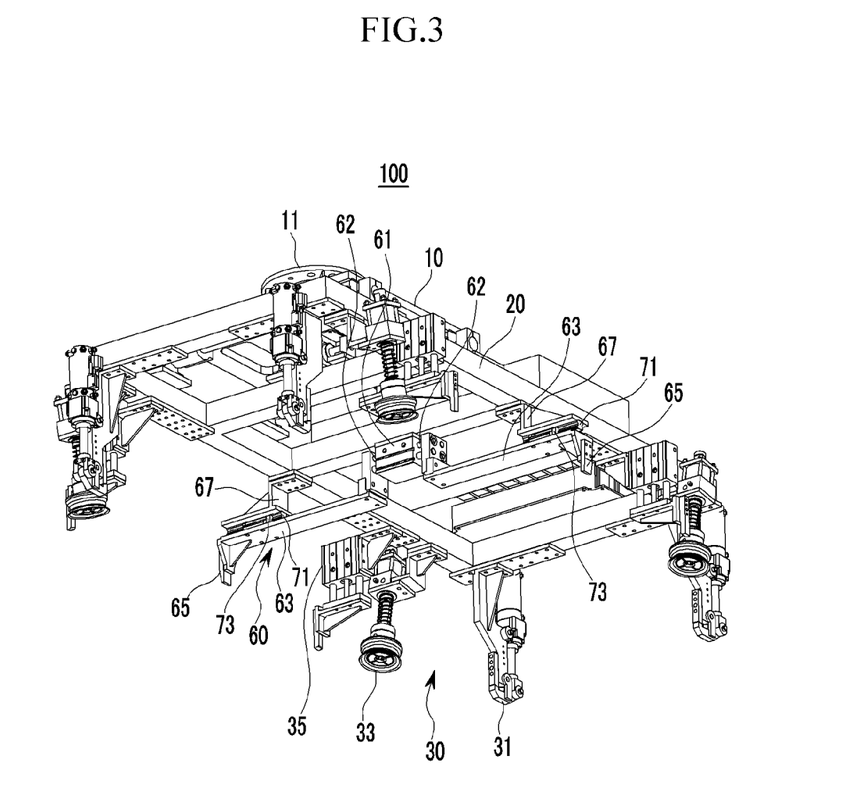

FIGS. 2 and 3 are perspective views illustrating the floating hanger for assembling a vehicle body roof according to the embodiment of the present invention.

Referring to FIGS. 1, and 3, the floating hanger 100 for assembling a vehicle body roof includes a fixing frame 10, a hanger frame 20, a floater 40, a position corrector 60, and a locker 80, and a description for each component is as follows.

The fixing frame 10 is mounted at a front end of an arm A of the robot R, and a tool changer 11 coupled with the front end of the arm A of the robot R is installed at an upper surface of the fixing frame 10.

The hanger frame 20 which restricts the roof panel 3 is installed at a lower surface of the fixing frame 10 to be floatable in a width direction of the vehicle body, moved (floated) in the width direction of the vehicle body 1 based on the vehicle body 1, and may set the roof panel 3 at a home position of the roof surface of the vehicle body 1.

A restrictor 30 is installed at the hanger frame 20 in order to restrict the roof panel 3.

The restrictor 30 includes a plurality of clampers 31 to clamp front side and rear side end portions of the roof panel 3, a plurality of vacuum cups 33 to suck an upper surface of the roof panel 3 using a vacuum, and a plurality of restriction cylinders 35 to restrict a position of the roof panel 3.

The clampers 31, the vacuum cups 33, and the restriction cylinders 35 of the restrictor 30 are installed at edge portions of the hanger frame 20 and disposed toward a lower direction thereof. Therefore, the pair of clampers 31 may be provided at front and rear edge portions of the hanger frame 20, respectively.

Because the restrictor 30 provided as a vehicle body assembly restriction apparatus is a widely known technology in this field, a more detailed description of a structure thereof will be omitted in the present specification.

In the embodiment of the present invention, the floater 40 is provided to float the hanger frame 20 with respect to the fixing frame 10 based on the vehicle body 1. The floater 40 is installed at the fixing frame 10 and the hanger frame 20.

Figure 4:
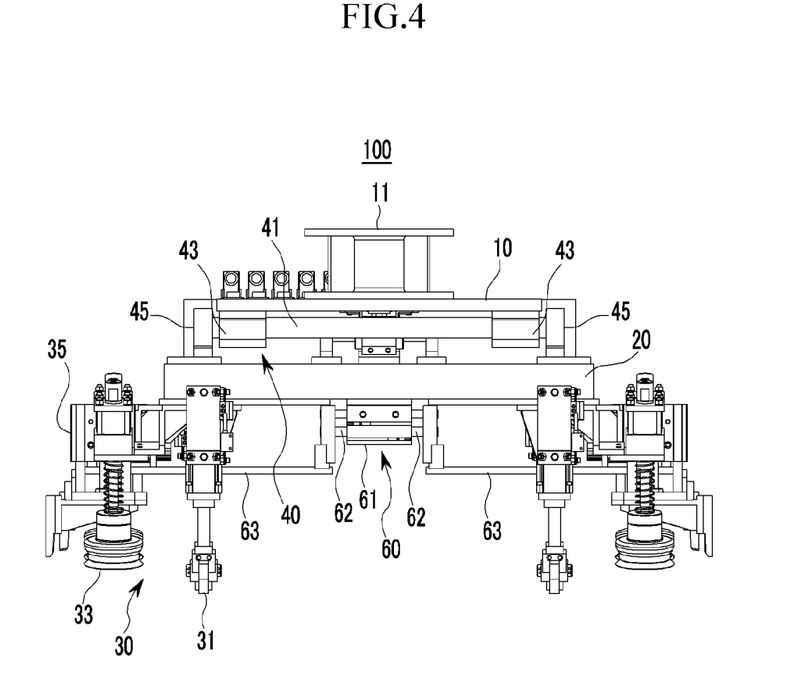
FIG. 4 is a view illustrating a floater applied to the floating hanger for assembling a vehicle body roof according to the embodiment of the present invention.

FIG. 4 is a view illustrating the floater applied to the floating hanger for assembling a vehicle body roof according to the embodiment of the present invention.

Referring to FIG. 4, the floater 40 according to the embodiment of the present invention includes a pair of guide bars 41 which is installed at the hanger frame 20, and coupling blocks 43 which are installed at the fixing frame 10.

The guide bars 41 are installed at an upper surface of the hanger frame 20 in parallel with a width direction of the vehicle body 1. The guide bar 41 has end portions that are coupled with fixing blocks 45 which are installed on the upper surface of the hanger frame 20.

Further, the coupling blocks 43 are fixed at edge portions of a lower surface of the fixing frame 10 to correspond with each of the guide bars 41, and slidably coupled with the guide bars 41.

In the embodiment of the present invention, the position corrector 60 is provided to float the hanger frame 20 to a set position of the roof panel 3 by using pressure applied to both sides of the roof panel 3 in a width direction.

Figure 5:
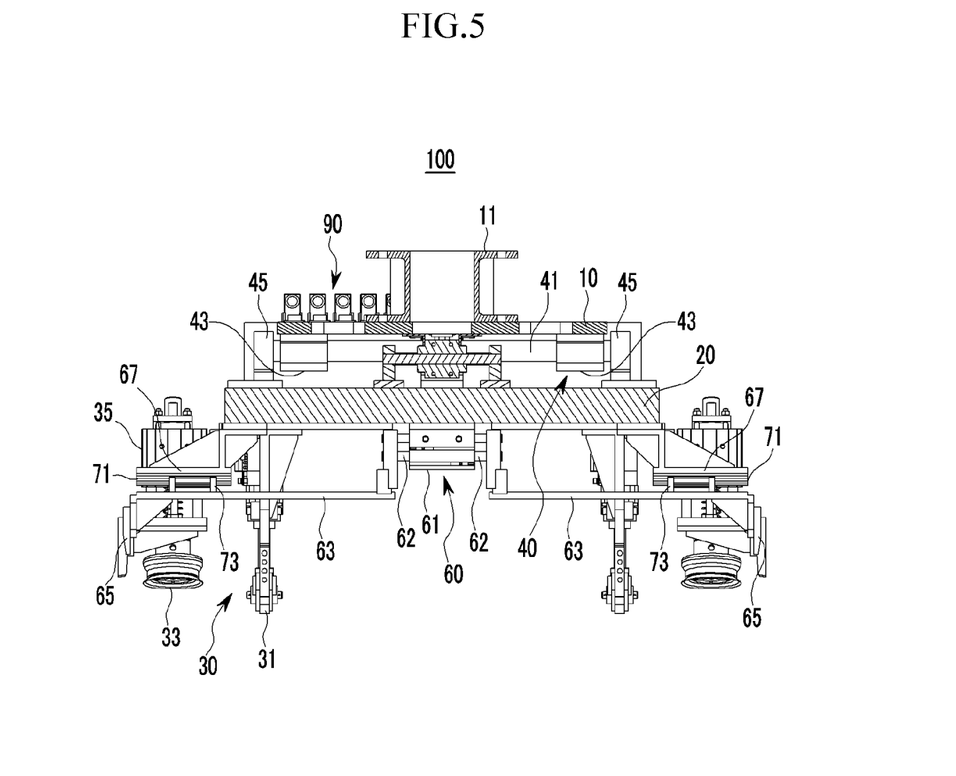
FIG. 5 is a view illustrating a position corrector applied to the floating hanger for assembling a vehicle body roof according to the embodiment of the present invention.

FIG. 5 is a view illustrating the position corrector applied to the floating hanger for assembling a vehicle body roof according to the embodiment of the present invention.

Referring to FIG. 5, the position corrector 60 is installed at the hanger frame 20 and may include a bidirectional cylinder 61, moving brackets 63, and stopper members 65.

The bidirectional cylinder 61 is fixed at a center of a lower surface of the hanger frame 20, and operating rods 62, which are movable forward and backward in the width direction of the vehicle body 1, are provided at both sides of the bidirectional cylinder 61.

The bidirectional cylinder 61 provides same operational force to the moving brackets 63, which will be described below in more detail. Because the bidirectional cylinder 61 is a widely known technology in this field, a more detailed description of a structure thereof will be omitted in the present specification.

The moving brackets 63 are coupled with both the operating rods 62 of the bidirectional cylinder 61 and provided to be reciprocate in the width direction of the vehicle body 1.

Here, the moving brackets 63 may be slidably coupled with guiders 71, which are coupled with the hanger frame 20 by fixing brackets 67 and sliders 73.

The stopper members 65 restrict both sides of the roof panel 3 and are installed and disposed at ends of the moving brackets 63.

The stopper member 65 with a groove shape, is provided to apply force (pressure) from the bidirectional cylinder 61 to both sides of the roof panel 3, that is, both edge portions according to a length direction of the roof panel 3, in the width direction of the vehicle body 1, and restrict molding portions which are disposed at both sides of the roof panel 3.

In FIG. 2 and FIG. 5, reference numeral 90 which has not been described, indicates an exchange unit to accommodate the stopper members 65 for different types of vehicle and allows the stopper member 65 to be exchanged in accordance with a type of vehicle.

Meanwhile, in the embodiment of the present invention, the locker 80, which is selectively coupled with an end portion of the fixing frame 10, locks and unlocks the floating operation of the hanger frame 20.

Figure 6:
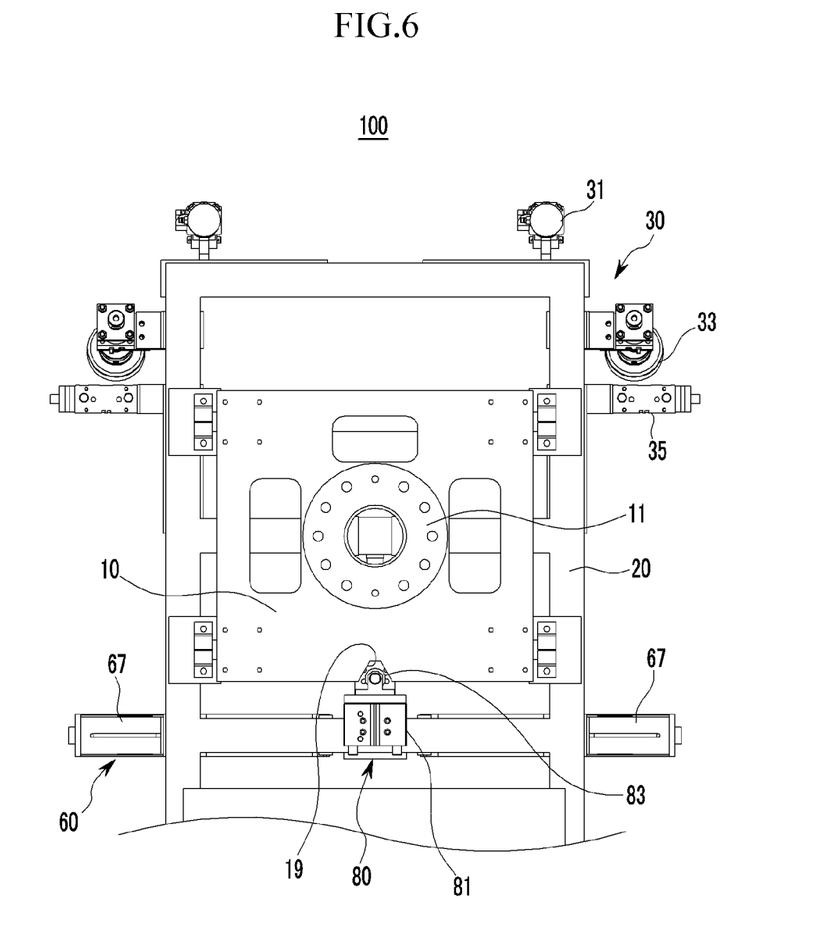
FIG. 6 is a view illustrating a locker applied to the floating hanger for assembling a vehicle body roof according to the embodiment of the present invention.

FIG. 6 is a view illustrating the locker applied to the floating hanger for assembling a vehicle body roof according to the embodiment of the present invention.

Referring to FIG. 6, the locker 80 is mounted on the upper surface of the hanger frame 20, and may be coupled with the end portion of the fixing frame 10.

The locker 80 includes a locking cylinder 81 installed at the hanger frame 20 and a locking member 83 which is moved forward and backward by the locking cylinder 81 and selectively coupled with the end portion of the fixing frame 10.

The locking cylinder 81 is mounted on the upper surface of the hanger frame 20 by a mount bracket 82 to face the end portion of the fixing frame 10. The locking member 83 is connected to an operating rod (not illustrated in the drawing) of the locking cylinder 81, and reciprocates to the end portion side of the fixing frame 10 by the operating rod.

A coupling groove 19 with a V shape, which the locking member 83 may be selectively coupled with, is formed at the end portion of the fixing frame 10 to correspond to the locking member 83 of the locker 80.

That is, when the locking member 83 is positioned at an opening portion side of the coupling groove 19 while being moved backward by an operation of the locking cylinder 81, a predetermined interval is present between the coupling groove 19 and the locking member 83 such that the floating operation of the hanger frame 20 may be unlocked.

Further, when the locking member 83 is brought into close contact with a groove surface of the coupling groove 19 while moving forward by the locking cylinder 81, an interval is not present between the coupling groove 19 and the locking member 83 such that the floating operation of the hanger frame 20 may be locked.

Hereinafter, an operation of the floating hanger 100 for assembling a vehicle body roof according to the embodiment of the present invention will be described in detail with reference to the drawings.

In the embodiment of the present invention, a position of the roof panel 3 with respect to the vehicle body 1 in a vehicle body transfer direction (T direction) may be corrected using the robot R by measuring a tooling hole formed in a pillar of the vehicle body 1 by a vision, calculating an error value through a vision controller, and transmitting the error value to the robot R.

Thereafter, the roof panel 3 is set on the roof surface of the vehicle body 1 in a state in which the roof panel 3 is restricted to the hanger frame 20 by the restrictor 30.

At this time, the stopper members 65 of the position corrector 60 are positioned at the molding portions, which are positioned at both sides of the roof panel 3 and have a groove shape, and are exchanged by the exchange unit 90 to be fitted with a type of vehicle.

Further, the locking member 83 of the locker 80 is moved backward by the locking cylinder 81, and is positioned at the opening portion side of the coupling groove 19 to unlock the floating operation of the hanger frame 20.

In the aforementioned state, as the bidirectional cylinder 61 of the position corrector 60 is operated, both the operating rods 62 are moved forward and backward in the width direction of the vehicle body.

The forward and backward force of the operating rods 62 is applied to the stopper members 65 through the moving brackets 63, and then applied to both the molding portions of the roof panel 3 through the stopper members 65 in the width direction of the vehicle body 1.

As the forward and backward force of the bidirectional cylinder 61 is applied to both sides of the roof panel 3, the hanger frame 20 is floated with respect to the fixing frame 10 in the width direction of the vehicle body 1 by a predetermined error in a set position of the roof panel 3, therefore, the roof panel 3 may be set at a home position of the roof surface of the vehicle body 1.

The hanger frame 20 is floated in the width direction of the vehicle body 1 as the coupling blocks 43 of the fixing frame 10 slide along the guide bars 41, and corrects a position of the roof panel 3 with respect to the roof surface of the vehicle body 1 in the width direction of the vehicle body 1.

When the roof panel 3 is set at a home position, the hanger frame 20 is floated in the width direction of the vehicle body 1, and the locking member 83 of the locker 80 is moved forward by the locking cylinder 81 and locks the floating operation of the hanger frame 20 as being close contact with the groove surface of the coupling groove 19.

Therefore, in the embodiment of the present invention, as a plurality of welding robots (not illustrated in the drawing) weld the roof panel 3 by a spot welding method, the roof panel 3 may be assembled to the vehicle body 1.

The floating hanger 100 for assembling a vehicle body roof according to the embodiment of the present invention, since a four surface index rotating body of the related art is removed and a vision system and a floating structure of the hanger frame 20 are applied, productivity may be improved, and investment costs for facilities and production costs for follow-up maintenance may be reduced.

In addition, because assembly variations of the roof panel 3 may be reduced, assembly quality and mass productivity of the roof panel 3 may be improved.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.
RestrictorcorrectorLocker

What is claimed is:

1. A floating hanger for assembling a vehicle body roof, which sets a roof panel at a home position of a roof surface of a vehicle body which is transferred to a work position along a transfer line, the floating hanger comprising:
a fixing frame fixed at an arm of a robot;
a hanger frame configured to restrict the roof panel and installed at the fixing frame to be floatable in a width direction of the vehicle body; and
a position corrector installed at the hanger frame and configured to float the hanger frame to a set position of the roof panel by using pressure which is applied to both sides of the roof panel in a width direction,
wherein the position corrector includes: a bidirectional cylinder fixed at a center of a lower surface of the hanger frame; moving brackets coupled with both operating rods of the bidirectional cylinder; and stopper members installed at ends of the moving brackets and configured to restrict both sides of the roof panel, and
wherein the moving brackets are slidably coupled with guiders provided at the hanger frame by sliders.

2. The floating hanger of claim 1, wherein:
the hanger frame is moved in the width direction of the vehicle body based on the vehicle body, and sets the roof panel at a home position of the roof surface of the vehicle body.

3. The floating hanger of claim 1, further comprising:
a floater installed at the fixing frame and the hanger frame and configured to float the hanger frame with respect to the fixing frame based on the vehicle body.

4. The floating hanger of claim 3, wherein:
the floater includes
a pair of guide bars installed at the hanger frame in parallel along the width direction of the vehicle body, and coupling blocks fixedly installed at the fixing frame and slidably coupled with the guide bars.

5. The floating hanger of claim 1, further comprising:
a locker mounted at the hanger frame, selectively coupled with an end of the fixing frame, and configured to lock a floating operation of the hanger frame.

6. The floating hanger of claim 5, wherein:
the locker includes
a locking cylinder fixedly installed at the hanger frame, and a locking member moved forward and backward by the locking cylinder and selectively coupled with the fixing frame.

7. The floating hanger of claim 6, wherein:
a coupling groove having a V shape, which the locking member is selectively coupled with, is formed at the fixing frame.

8. The floating hanger of claim 1, wherein:
the bidirectional cylinder provides the same operational force to the moving brackets.

9. The floating hanger of claim 1, wherein:
a restrictor configured to restrict the roof panel is installed at the hanger frame.

* * * * *